United States Patent
Hull et al.

(10) Patent No.: US 12,309,442 B2
(45) Date of Patent: May 20, 2025

(54) MODIFIED CONTENT DELIVERY

(71) Applicant: Comcast Cable Communications, LLC, Philadelphia, PA (US)

(72) Inventors: Matt Hull, Philadelphia, PA (US); Ilmir Moussikaev, New York, NY (US); Wei Wang, New York, NY (US); Yi Fang Chen, New York, NY (US); Eleftherios Soulas, New York, NY (US); Chris Whitely, New York, NY (US); Boris Freydin, New York, NY (US); Joel Iglesias, New York, NY (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/651,840

(22) Filed: Jul. 17, 2017

(65) Prior Publication Data

US 2018/0020251 A1     Jan. 18, 2018

Related U.S. Application Data

(60) Provisional application No. 62/363,039, filed on Jul. 15, 2016.

(51) Int. Cl.
    *H04N 21/25*          (2011.01)
    *H04N 21/234*       (2011.01)
    (Continued)

(52) U.S. Cl.
    CPC ..... *H04N 21/252* (2013.01); *H04N 21/23406* (2013.01); *H04N 21/25891* (2013.01); *H04N 21/44226* (2020.08); *H04N 21/6582* (2013.01)

(58) Field of Classification Search
    CPC ....... H04N 21/25891; H04N 21/44222; H04N 21/6582; H04N 21/252; H04N 21/4667;
(Continued)

(56) References Cited

U.S. PATENT DOCUMENTS

| | | | | | |
|---|---|---|---|---|---|
| 4,574,304 | A | * | 3/1986 | Watanabe | H04H 60/43 |
| | | | | | 348/E7.054 |
| 5,819,156 | A | * | 10/1998 | Belmont | H04N 21/44222 |
| | | | | | 725/14 |

(Continued)

FOREIGN PATENT DOCUMENTS

WO    WO-2014031910 A1 * 2/2014 ........... H04N 21/252

OTHER PUBLICATIONS

F. Alvarez et al., "Audience Measurement Modeling for Convergent Broadcasting and IPTV Networks," in IEEE Transactions on Broadcasting, vol. 55, No. 2, pp. 502-515, Jun. 2009, doi: 10.1109/TBC.2008.2012040 (Year: 2009).*

(Continued)

*Primary Examiner* — Cynthia M Fogg
(74) *Attorney, Agent, or Firm* — Banner & Witcoff, Ltd.

(57) ABSTRACT

A method is described for obtaining and using viewership data to determine relationships between previous viewership of an episodic program and viewership of future episodes of the program. Aggregating the data may comprise determining missing data points and predicting substitute data points based on past viewership data for the individual viewer and a plurality of other viewers. Data may be presented to the user in a number of ways to aid in analysis and planning of likely viewership for a season of a television program. Data may be used to optimize advertising revenues, plan television lineups to maximize a number of likely viewers, or allocate content and resources between broadcast and video-on-demand.

65 Claims, 12 Drawing Sheets

(51) Int. Cl.
*H04N 21/258* (2011.01)
*H04N 21/442* (2011.01)
*H04N 21/658* (2011.01)

(58) Field of Classification Search
CPC ....... H04N 21/26241; H04N 21/44204; H04N 21/44213; H04N 21/466; H04N 21/4661; H04N 21/23406; H04N 21/44226; H04N 21/4532; H04N 21/4668; H04N 21/4755; H04N 21/442; H04N 21/25866; H04N 21/4622; H04N 7/17318; H04N 21/47202; H04N 21/4524; H04N 21/4666; G06Q 30/0264; G06Q 30/0255; G06Q 30/0269; H04H 60/06; H04H 60/46; H04H 60/61; G06F 17/30843; G04H 60/33; H04L 29/08675
USPC .......................................................... 725/19
See application file for complete search history.

(56) References Cited

U.S. PATENT DOCUMENTS

| | | | | |
|---|---|---|---|---|
| 6,289,514 | B1* | 9/2001 | Link | H04H 60/31 725/14 |
| 6,850,252 | B1* | 2/2005 | Hoffberg | H04N 21/475 380/252 |
| 9,219,736 | B1* | 12/2015 | Lewis | H04L 67/53 |
| 2003/0154493 | A1* | 8/2003 | Kagle | H04N 21/458 725/115 |
| 2003/0223734 | A1* | 12/2003 | Cooper, Jr. | H04N 21/4345 386/244 |
| 2005/0160465 | A1* | 7/2005 | Walker | H04N 21/2393 725/86 |
| 2005/0235318 | A1* | 10/2005 | Grauch | G06Q 30/0273 725/46 |
| 2007/0136751 | A1* | 6/2007 | Garbow | H04N 21/4316 725/46 |
| 2007/0157249 | A1* | 7/2007 | Cordray | H04N 21/4825 725/58 |
| 2008/0195460 | A1* | 8/2008 | Varghese | G06Q 30/02 705/14.1 |
| 2012/0030587 | A1* | 2/2012 | Ketkar | H04N 21/4516 715/751 |
| 2012/0260280 | A1* | 10/2012 | Harsh | H04N 21/24 725/21 |
| 2013/0247080 | A1* | 9/2013 | Vinson | H04N 21/44213 725/14 |
| 2013/0339991 | A1* | 12/2013 | Ricci | H04N 21/4758 725/25 |
| 2014/0109124 | A1* | 4/2014 | Morales | H04N 21/44204 725/14 |
| 2014/0130099 | A1* | 5/2014 | Kunisetty | H04N 21/475 725/50 |
| 2014/0208268 | A1* | 7/2014 | Jimenez | H04N 21/6582 715/811 |
| 2014/0259038 | A1* | 9/2014 | Belyaev | H04N 21/4622 725/14 |
| 2015/0134733 | A1* | 5/2015 | Maturana | H04L 67/12 709/203 |
| 2015/0189351 | A1* | 7/2015 | Kitts | H04N 21/23424 725/19 |
| 2015/0262207 | A1* | 9/2015 | Rao | G06Q 30/0201 705/7.32 |
| 2016/0142783 | A1* | 5/2016 | Bagga | H04N 21/47214 725/47 |
| 2017/0206683 | A1* | 7/2017 | Beckett | G06F 16/248 |
| 2017/0236060 | A1* | 8/2017 | Ignatyev | G06N 5/01 706/46 |
| 2017/0339434 | A1* | 11/2017 | Watson | H04N 21/47214 725/47 |
| 2018/0077431 | A1* | 3/2018 | Wei | H04N 21/222 |
| 2019/0068659 | A1* | 2/2019 | Davar | G06Q 50/01 |

OTHER PUBLICATIONS

Matsa, Katerina Eva, "Early morning, noon and late evening slots drive growth in local TV news", Jul. 15, 2015, Pew Research Center, (http://pewrsr.ch/1L9ZJ72). (Year: 2015).*

* cited by examiner

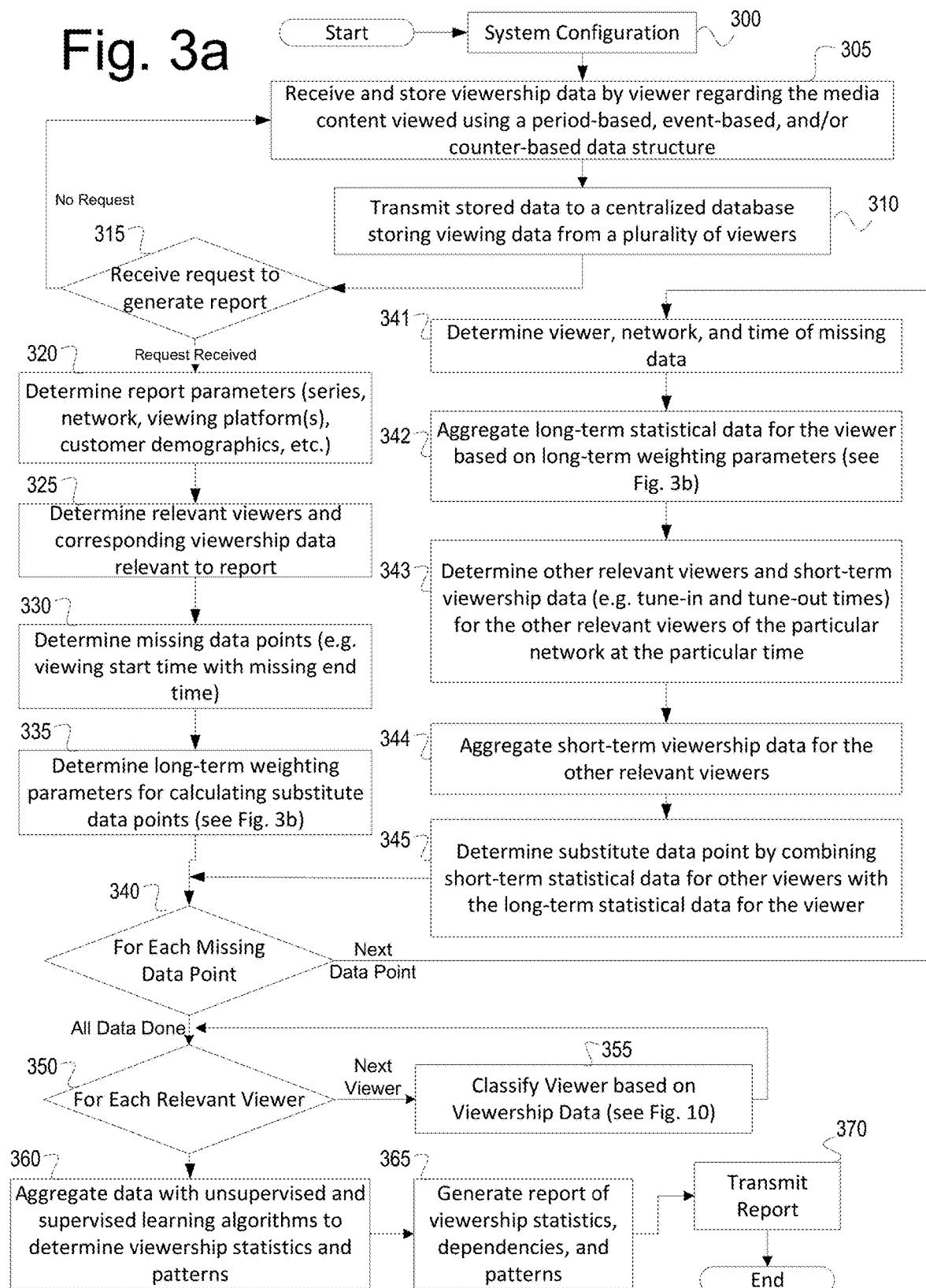

| Viewing History for: | Example Weighting |
|---|---|
| Other Episode of Same Series | 2 |
| Other Episode of Same Season | 1.2 |
| Same Network | 1.5 |
| Same Genre | 1 |
| Same Day of Week and/or Daypart | 0.8 |
| Same Viewing Platform | 1.3 |
| Data from past Month | 1.6 |
| Data from past 6 Months | 1.1 |

Fig. 3b

| | Network | Program | Season | Episode | Duration | Uninterrupted | Tuning Events | Platform | Delay | Daypart | Day |
|---|---|---|---|---|---|---|---|---|---|---|---|
| 450 | HBO | Game of Thrones | 5 | 1 | 52m | 52m | 0 | Linear | Live | Late Fringe | Sun. |
| 451 | HBO | Game of Thrones | 5 | 2 | 52m | 12m | 1 | Linear | Live | Late Fringe | Sun. |
| 452 | CBS | The Late Show | 1 | 92 | 22m | 10m | 5 | Linear | Live | Late Fringe | Tue. |
| 453 | TBS | Seinfeld | 5 | 2 | 22m | 22m | 0 | Linear | 7+ Days | Early Fringe | Wed. |
| 454 | NBC | Today | 25 | 68 | 180m | 20m | 2 | Linear | Live | Early Morning | Thu. |
| 455 | HBO | Game of Thrones | 5 | 3 | 52m | 52m | 0 | VOD | 2-3 Days | Late Fringe | Tue. |
| 456 | HBO | Game of Thrones | 5 | 4 | 52m | 52m | 0 | DVR | Within 1 Day | Overnight | Mon. |

Fig. 4

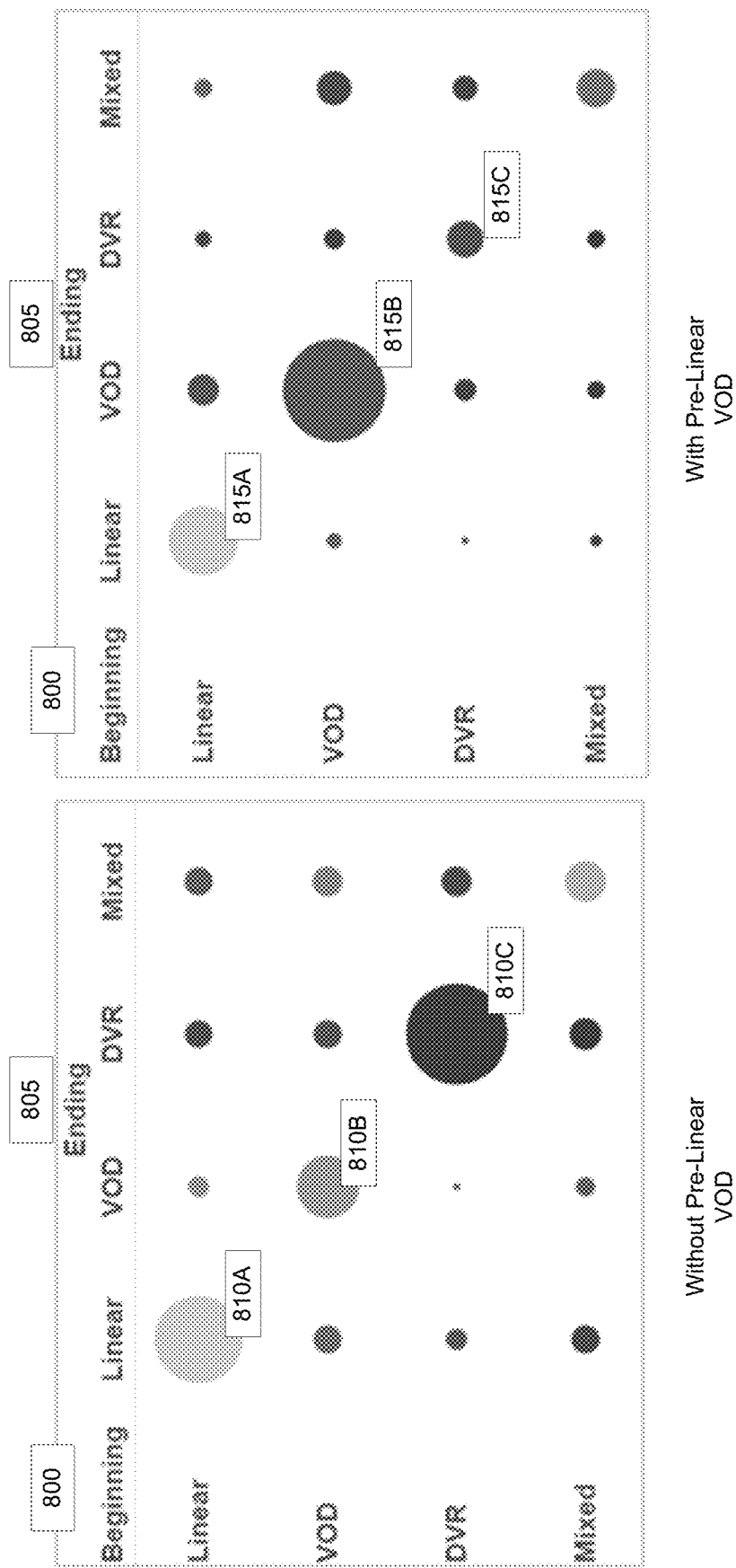

MODIFIED CONTENT DELIVERY

RELATED APPLICATION DATA

This application claims priority to, and the benefit of U.S. Provisional Patent Application No. 62/363039, filed Jul. 15, 2016 and entitled "Programming Insight and Analysis." The earlier provisional patent application is entirely incorporated herein by reference.

BACKGROUND

The transmission of media content, such as television programs, movies, music, etc., has always required resources such as transmission bandwidth and routing devices. Those resources are limited, however, and there is an ever-increasing array of media content that can be delivered. Accordingly, there is an ever-present need for media content providers to maximize the efficiency with which the resources are used. One approach to this efficiency is to use the resources to provide the media content that will be of most interest to the consuming end users, and to minimize the use of resources in transmitting media content that goes unwatched.

User surveys may be used, but some surveys may be inconvenient to the users.

Accordingly, there is a need for methods of accurately determining consumer behaviors and intents, while minimizing inconvenience to users.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein are directed to monitoring consumer behavior regarding a television show or other episodic content and outputting a report based on the viewership data.

Aspects described herein are further directed to receiving viewership data for a viewer, determining missing data, such as data comprising when a viewer started viewing a network programming but missing when the viewer stopped viewing the network programming, and determining a substitute data point that may be used for the report. The substitute data point may be determined by other viewership data for the viewer, such as start and stop times for the viewer corresponding to other network programming having similar characteristics (such as other episodes of the same series or season of the series, other shows of the same genre, other programming on the same network or during the same time of day, etc.). The substitute date may additionally or alternatively be determined by viewership data for a plurality of other viewers of the same network programming, such as the times other viewers started and stopped watching the network on that day or time. As described below, other data may also be considered, alone or in combination, when determining the missing data.

Report parameters may cover five different scopes, such as in-episode, cross-episode, cross-season, in-network, and cross-network.

In-episode analysis may comprise storing at a highly granular level—for example, second by second—a consumer's viewing and channel changes during a single episode of a show. The behavior may be analyzed to determine whether a consumer is exhibiting "channel-surfing" behavior or is watching an episode without interruption. The data may be used to establish a profile for a given consumer that stores the consumer's typical behavior with respect to a given program, with respect to a given time slot, or with respect to a given medium by which media content is received.

Cross-episode analysis may comprise storing information indicating in-episode behavior changes over time when the scope is expanded to consider multiple episodes. Consumers may exhibit behavior of a "streak" of multiple episodes viewed in a row, a "gap" of one or more episodes missed in between viewed episodes, or may show more interest in one half or arc of a season than in another. All of this data may be used to further augment a consumer profile.

Cross-season analysis may comprise storing how episode viewership changes in one season in comparison to another season. For example, statistics may be gathered on the percentage drop from a first season to a subsequent season, or on viewers who complete a first season but abandon watching during a second season In-network analysis may comprise storing when a viewer views a particular network or media source, and determining patterns in the times of day or days of the week that a viewer typically tunes into the network or media source.

Cross-network analysis may comprise augmenting a consumer profile with multiple in-network analysis data points, to determine comparative values, such as how much more one network is viewed by a given viewer than another network, or to determine correlations, such as viewership of one network being predictive of viewership of another network.

All of the collected data may be not only aggregated for higher-quality and more informative viewership statistics, but may also be queried to look for patterns or previously unseen data relationships that may be useful to advertisers or those planning a lineup of television shows.

Pattern discovery and analysis may be accomplished by a variety of unsupervised artificial intelligence analysis systems, such as converting viewership statistics to multidimensional vectors and inputting them into a k-means classification analysis.

Discovered patterns and predicted viewer behavior may be used to optimize a television network's lineup, to take advantage of synergy between overlapping fan bases of two shows by co-locating them, and to maximize advertising revenue by placing ads at times when predicted viewership will be highest.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 3A illustrates a method which may be used to generate data stores used in accomplishing one or more embodiments according to one or more aspects described herein.

FIG. 3B illustrates a method which may be used to generate missing data in accomplishing one or more embodiments according to one or more aspects described herein.

FIG. 4 illustrates an example set of "in-episode" and "in-network" data that may be determined and stored according to an embodiment and in support of further embodiments.

FIGS. 8A and 8B illustrate an entry/exit platform analysis that may be performed to determine the dominant platform paths that households take when viewing a series, according to one or more aspects described herein.

DETAILED DESCRIPTION

Figure 1:
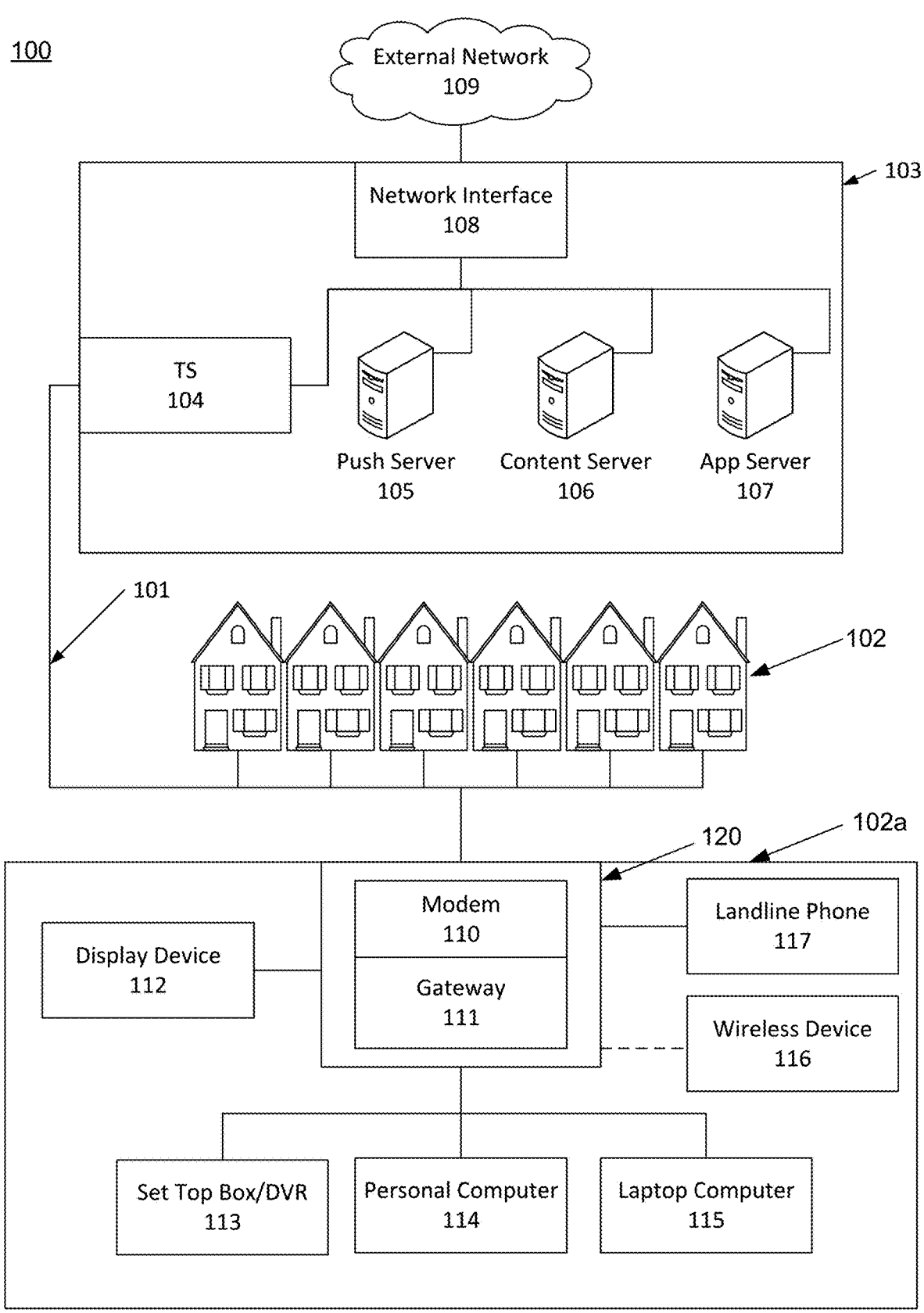
FIG. 1 illustrates an example communication network on which various features described herein may be implemented.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Various features of the methods and systems for tracking individual and aggregated viewership statistics for predictive purposes will be further described below.

The viewership data, aggregated viewership statistics and/or reports may be beneficial to and used by many users. For example, viewership data may assist a user of the data, such as senior management or a finance department for a network, in setting the annual budget. Funds and internal resources may be redirected to higher growth areas and investments into shrinking areas may be lowered. The viewership data may allow a user to identify emerging trends faster.

Viewership data may also guide programming decisions, such as the program mix (e.g. how many series, what genres to include), which specific series to select, how many episodes to order, and what type(s) of season licenses to buy or sell (full ownership, digital, U.S./international rights, etc.). Viewership data may additionally or alternatively assist in determining program windowing on multichannel video programming distributors (MVPDs), over the top content (OTT), syndication, and/or international. For example, the data may be used to maximize target audience viewership within top monetizable windows, maximize asset value among distribution channels, and minimize asset cannibalization.

Viewership data may also guide scheduling decisions, such as time slot placement, to maximize the target audience sampling, maximize viewership of the live programming and viewership in the days immediately following the live programming (such as C7 viewership—live plus seven days), increase lead-in and lead-out retention, maximize asset utilization, and optimize schedule ratings and program acquisition cost.

Viewership data may also guide marketing decisions, such as promotion planning and social media or word of mouth optimization.

In one embodiment, a content scheduler might wish to optimize a content schedule for the broadest audience. For example, based on past viewer behavior on Thursday nights from 9-11 PM, a classifier might show that a general audience viewers active at that time would likely be more actively engaged with one program than with another. Therefore, the network could either not renew the second program or could move the second program to a new time to compete with programs in a different time slot.

In another embodiment, it may be determined that there is significant overlap in fanbases, or audiences with the highest engagement, of two programs that are broadcast on different nights. A broadcaster might use this information to move one program so that they are show on the same night, and fans of each program are more likely to watch both programs, driving up total viewership.

In another embodiment, viewership of a show over the course of an entire season may be predicted by taking into account an expected rate of retention of viewers from a first episode to a second, then extrapolating using the same rate of retention again from the second to the third, repeating stochastically until a predicted viewership for a series finale is estimated. The resultant information could be used to estimate the value of an advertising contract for advertisement space interspersed with episodes for the remainder of the season.

In another embodiment, the viewership of one current show may be determined to be similar to the viewership of another show aired in the past, and determined viewership statistics of the past show may be used to predict audience engagement with the current show. For example, if 90% of viewers of The West Wing were retained after each season, a similar statistic may be estimated for a modern political drama having similar plot elements.

In another embodiment, viewership data may be used to estimate viewer engagement with summer reruns of previously broadcast linear content, based on, for example, data determined regarding the habits of a viewing audience on summer evenings, habits of the viewership of the programs when those programs were first aired, and viewer behavior regarding reruns in general. Whether the airing of summer reruns will affect viewership behavior towards new episodes in autumn may also be estimated. A broadcaster may use the resulting data to decide not to oversaturate with a particular program and thus dampen enthusiasm for a new series of the program in the autumn.

In another embodiment, the effect of a VOD offering may be estimated by considering data regarding whether viewers jump from the VOD platform to the linear platform, how VOD offerings have affected linear viewership in the past, and differences between the typical viewer audiences that rely on VOD and those who do not. Whether to offer VOD before an episode has broadcast, how many episodes of past content should be available on VOD, and comparative costs and benefits of releasing a program exclusively on VOD may be determined via estimates of viewer behavior.

In another embodiment, the effect of placing a program in a known unpopular timeslot may be predicted and potentially mitigated by examining the likelihood that fans of the program will choose to use VOD or DVR to watch the program at a time other than its linear broadcast airing. A broadcaster may choose to offer a program at the unpopular time or to stop broadcasting entirely if the audience is likely to switch to a different platform and continue viewing.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicate with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
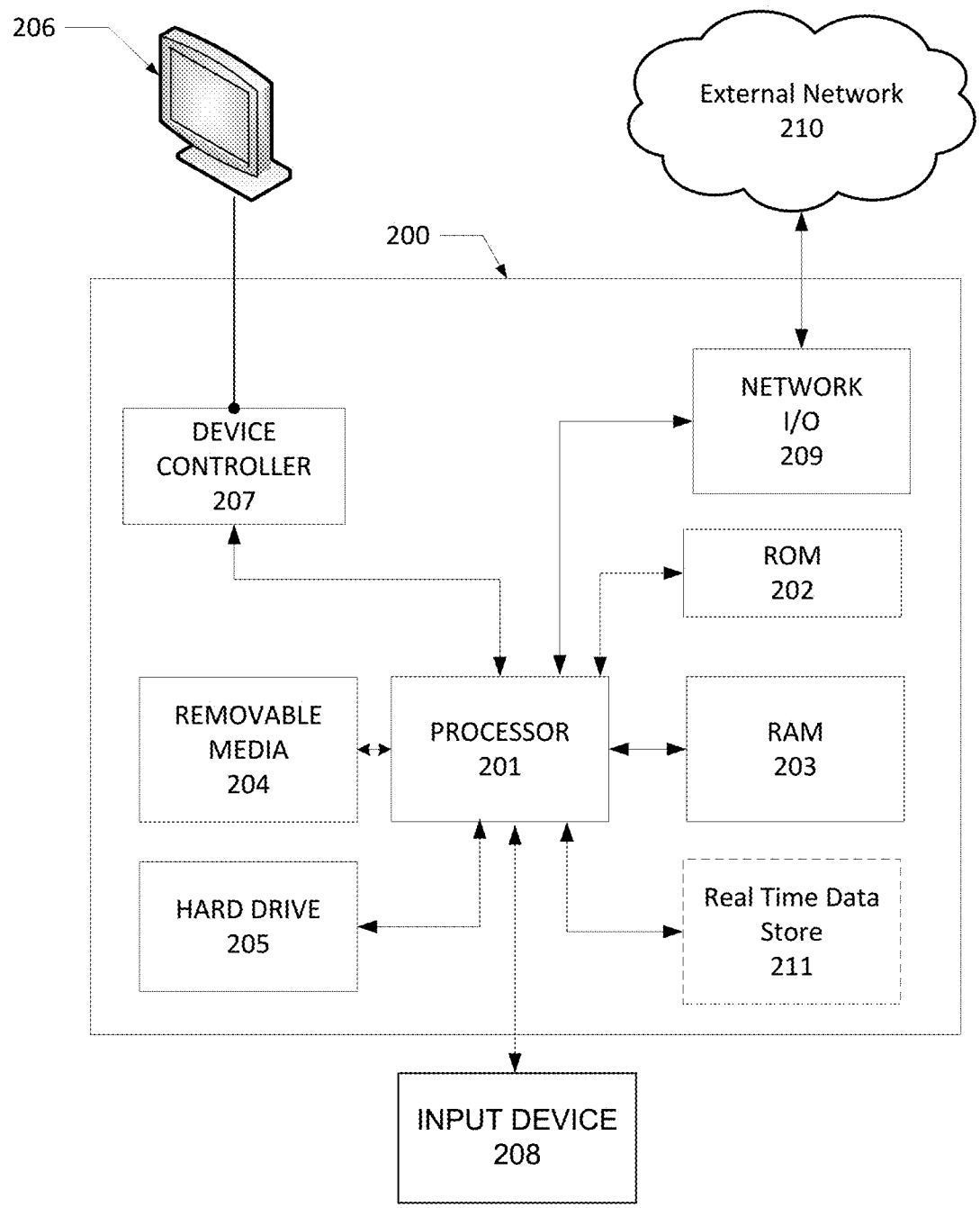
FIG. 2 illustrates an example computing device that can be used to implement any of the system, methods, servers, entities, and computing devices described herein.

Having described an example communication network shown in FIG. 1 in which various features described herein may be implemented, an example computing device as shown in FIG. 2 will be described.

FIG. 2 illustrates general hardware elements that can be used to implement any of the various systems or computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, camera input for user gestures, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, in some embodiments the device may be configured to implement one or more aspects discussed herein. For example, the device may include a real-time data store 211, which may be configured to receive, store, and send information regarding events that take place at the device and/or in the network and associated context. The real-time data store 211 may utilize other components of the device, such as hard drive 205, removable media 204, and/or RAM 203.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

FIG. 3A depicts a method which may be used to generate data stores used in accomplishing one or more embodiments according to one or more aspects described herein.

In step 300, an initial configuration of the system may be performed. This initial configuration may include a variety of actions. For example, an application may be configured to detect when a viewer tunes into and tunes out of a network or program. Factors for calculating missing data points, such as the factors depicted in FIG. 3b and described in more detail below, may be initialized. Communication links may be established between a centralized server, an output server, and/or servers associated with devices capable of displaying network content.

In step 305, a computing device may track a viewer's chosen network or media source. A determination may be made that a viewer has requested media from a particular network or media source for viewing on a display device. This determination may be made by a computing device used to request and/or process media, such as a set top box (STB), digital video recorder (DVR), a personal mobile computing device such as a cell phone or smart phone, or another computing device such as a laptop, notebook, tablet, desktop computer, or thin client to a virtualization server.

The viewer's device may periodically transmit a report of the viewer's chosen network or media source over a predetermined period of time to the computing device tracking the viewer's chosen network. Additionally or alternatively, the viewer's device may transmit each "tune in"/"tune out" event, e.g. the boundary time at which a viewer starts or stops viewing a specific network or program.

The computing device tracking the viewer's chosen network or media source may establish a data structure for tracking viewership data, and begin populating the data structure with the viewer's choice for a particular range of time. The data structure may comprise entries for a number of periods of equal duration throughout a day, such as every second, every five seconds, every thirty seconds, every minute, every five minutes, or every half hour of a day, storing a network, media source, or particular content which was viewed for the entirety, majority, or plurality of the period. Alternatively, the data structure may log "tune in"/"tune out" events, (e.g. start times and end times, or "boundary times" for a viewing event), e.g. the times at which a viewer changed a channel to a new network, selected a new data source, started or stopped streaming data, etc.. A table of tune in and tune out events may be used to derive what a viewer was viewing at a particular moment in time or during a particular range of time, while requiring less memory to store a complete chronological ordering of a viewer's viewing. Alternatively, a number of counters may be stored for a plurality of networks and a plurality of time slots, such as slots for each hour, half hour, or minute. The counters may be incremented to include the numbers of seconds or minutes which a viewer viewed a given network during the given time slot. Use of counters may lose the strict chronological ordering of data, but may allow for faster and more efficient aggregation of data for querying.

In step 310, the computing device may transmit its data structure contents to a centralized computing device, such as a database at a headend of a content distribution network, in order to store data regarding viewership data for a plurality of viewers. This may be an ongoing or continuous process. Additionally or alternatively, data may be transmitted at predetermined intervals. This information may be denoted as first-order data that has been gathered without analysis to understand any particular viewer's habits or motivations.

In step 315, the centralized computing device may receive a request for a report to aggregate the viewership data of multiple viewers. For example, network management may request a report for a series and base the decision of whether to renew the series for the next season in part on the viewership data presented in the report. As another example, the report may be requested and used to guide marketing decisions for upcoming programming. If no request is received, the computing device and centralized computing device may continue receiving and storing viewership data at steps 305 and 310.

In step 320, the centralized computing device may determine the report parameters. The report parameters may have been transmitted with the report request. Additionally or alternatively, the centralized computing device may receive a separate input for the report parameters. Report parameters may include which shows or networks to include in the report, and/or over what time period. Report parameters may also specify whether the report should include in-episode, cross-episode, cross-season, in-network, and/or cross-network analysis. For example, a report for season 3 of the HBO show "Game of Thrones" may be requested. Additionally or alternatively, a report for a specified time period and network, such as Monday nights from 7:00 pm to 8:00 pm, may be requested. Additionally or alternatively, the report parameters may specify which viewing platforms to include, as described in more detail below with respect to FIG. 4, Platform 435. Additionally or alternative, the report parameters may specify certain viewer demographics, such as a geographical region, and/or an age group of the viewers.

In step 325, the centralized computing device may determine the relevant viewers and the corresponding viewership data relevant to the report. For example, if the report parameters specified all viewers of any episode(s), and/or partial episodes, of the HBO show "Game of Thrones" season 3, the relevant data may include all viewership data where the viewer requested an episode of season 3, and/or was tuned into a network broadcasting an episode of season 3, for viewing on a display device In some cases, the viewership data may be incomplete. For example, the viewer's device may have failed to record a viewing event, may have failed to transmit part of the data, and/or the centralized computing device may not have received all of the data. As an example of incomplete data, the data may show that a first viewer tuned into the network HBO at 7:00 pm on a Monday night, and the next activity included in the viewership data may show that the first viewer tuned into the network HBO at 3:00 pm on Thursday. This may indicate missing viewership data about when the first viewer tuned out of the network HBO, or stopped watching, on Monday night. The centralized computing device may estimate a predicted missing data point (such as a missing start or end time) so that the viewer's information can still be used in the overall report. To estimate the missing data point, the centralized computing device may aggregate long-term viewing data for the first viewer (such as viewership data related to other episodes of the same show, or to other programming watched during the same programming time, as described in more detail with respect to FIG. 3A) and combine that data with short-term viewership data for a plurality of other viewers (such as viewership data for other viewers of the same network or programming over the same time period). The long-term data may comprise viewership data over the last couple weeks, month(s), six-months, year, several years, for example. The short-term data may comprise viewership data for the specific date and daypart of the missing data, within 24 hours of the missing data, or within one week of the missing data, for example.

In step 330, the centralized computing device may prepare to correct these imperfections in the collected data by determining whether there are any missing data points and/or identifying the missing data points. For example, the centralized computing device may determine that the data structure logged that a first viewer tuned into a particular network, but the data structure failed to log when the first viewer tuned out of the particular network, and identify this missing tune-out time as a missing data point.

In step 335, the system may determine long-term weighting parameters for calculating missing data. The factors will be described in more detail with respect to step 342. The long-term weighting parameters may have been initialized at system configuration. Additionally or alternatively, the request to generate a report at 315 may have included the long-term weighting parameters. Additionally or alternatively, the centralized computer may have received a separate viewer input specifying long-term weighting parameters.

In step 340, the centralized computing device may begin a loop for determining substitute data points for each missing data point.

In step 341, the centralized computing device may determine relevant information about the missing data point, such as the identity of the viewer, the network, show, and/or viewing platform tied to the missing data point, and/or the time of the missing data point based on the corresponding known point (for example, if the data shows the viewer tuned into a network at 7:00:00 pm on a Monday, but was missing a tune out time, the time for the missing data point may be between Monday at 7:00:01 pm and within a predetermined number of hours, such as the same time the next day). As another example, and to further illustrate the following steps 342 to 345, the imperfect data may show the first viewer tuned into a particular network showing a professional playoff game, such as Game 3 of the NBA Finals on a Monday night.

In step 342, the centralized computing device may aggregate long-term statistical data for the first viewer to determine a first candidate substitute start or stop time by looking at his or her typical viewing habits, such as for: the programming or type of programming that aired at the time the first viewer tuned in; the following programming on the particular network; the network independent of specific programming; and/or for that Daypart (see discussion for FIG. 4, item 445) and/or day of week. The long-term statistical data may comprise a plurality of tune-in and tune-out times (e.g. start times and end times). Long-term viewership data for the viewer for a combination of the factors depicted in FIG. 3b may be used, with viewership data for some of the factors weighted more importantly than viewership data for other factors. The first candidate substitute start time or stop time may be determined by a weighted average of the data. For example, the long-term viewership data for the viewer of other episodes of the same series may be weighted more heavily that long-term viewership data for the viewer of other shows of the same genre, such that if the viewer typically watched 80% of the episode when watching other episodes of the same series, and but typically watched only 50% of other shows of the same genre, the first candidate start or stop time may be based on the user having watch 70% of the network programming at the time of the missing data. Additionally or alternatively, more recent viewership data may be weighted more heavily than older viewership data. Any number of factors may be considered. The example weights for the various factors, as shown in FIG. 3b, are representative and may be modified as described in step 335. Continuing the example above regarding Game 3 of the NBA Finals, long-term statistical data for the first viewer may show that the first viewer typically tunes out of sports programming by 10 μm on a given night.

At step 343, the centralized computing device may determine other viewers who were tuned into the particular network at the time the first viewer tuned into that network, and/or other viewers who have watched the same network programming (e.g. episode and/or show and/or performance and/or sporting event, etc.), and/or other viewers who viewed the network programming on the same viewing platform. Additionally or alternatively, the centralized computing device may use a subset of all viewers who were tuned in at that time, such as those viewing from the same or nearby geographic area, those viewers known to have similar viewing habits as the first viewer, or those who tuned into the particular network within a certain time from when the first viewer tuned into the particular network.

In step 344, the centralized computing device may aggregate the short-term viewership data for all viewers determined at step 343 to determine a second candidate substitute start or stop time based on the average time viewers tuned out of the particular network and/or network programming. Short-term viewership data may correspond to viewers who watched the same network and/or network programming on the same day, the same week, or within the past 30 days, for example. Referring again to the NBA Finals example, short term statistical data for other viewers watching Game 3 of the NBA Finals may show that a large percentage of the viewers watched the particular network until the end of the game around 11 pm. Further, the short term statistical data may show that many other viewers who typically tune out of sports programming before the end of a game did not tune out on this evening until the game ended.

In step 345, the centralized computing device may determine substitute data points by combining the long-term statistical data for the first viewer, as determined at step 342, with the short-term statistical data for other viewers, as determined at step 344, and add the substitute data point to overall viewership data in replace of the missing or corrupted data point. Referring again to the NBA Finals example, the centralized computing device may aggregate this long-term first viewer data (such as data showing the viewer typically tunes out of sports programming by 10 pm on a given night) with the short-term data from other viewers (such as that a large percentage of the viewers watched the particular network until the end of the game around 11 pm) to predict when the first viewer tuned out of the game, such as weighting the long-term viewing data more heavily and predicting that the first viewer likely also watched the programming until the game ended around 11pm, or that the viewer tuned out closer to 11:00 pm than 10:00 pm. Additionally or alternatively, the long-term viewer data for the first viewer may be weighted more heavily than the short-term viewing data for the plurality of other viewers, resulting in a substitute data point closer to 10:00 pm.

Figure 9:
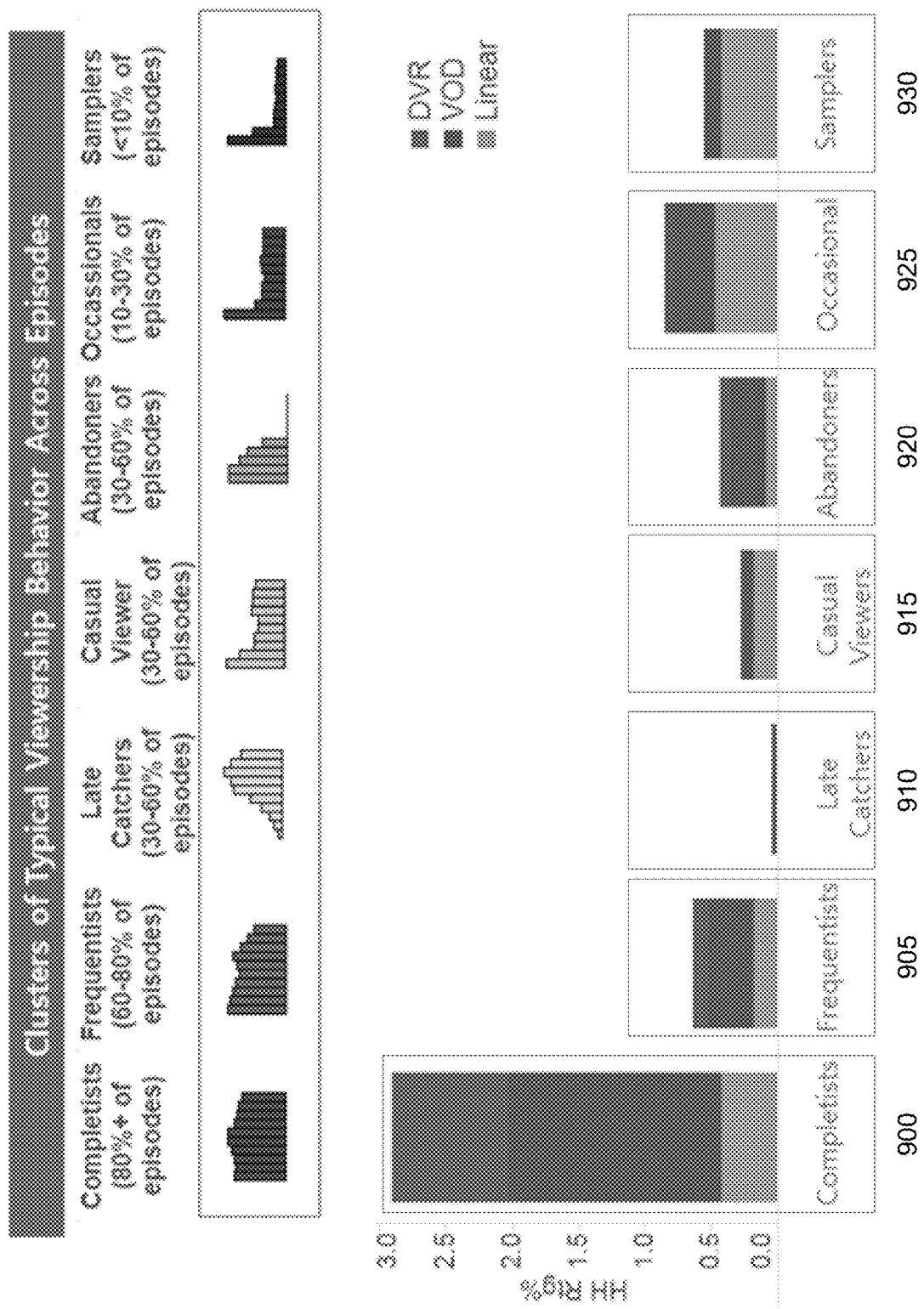
FIG. 9 illustrates a graph which may be generated, showing relative numbers of viewers with a given viewership designation, as well as the preferred platform choices of those viewers.
Figure 10:
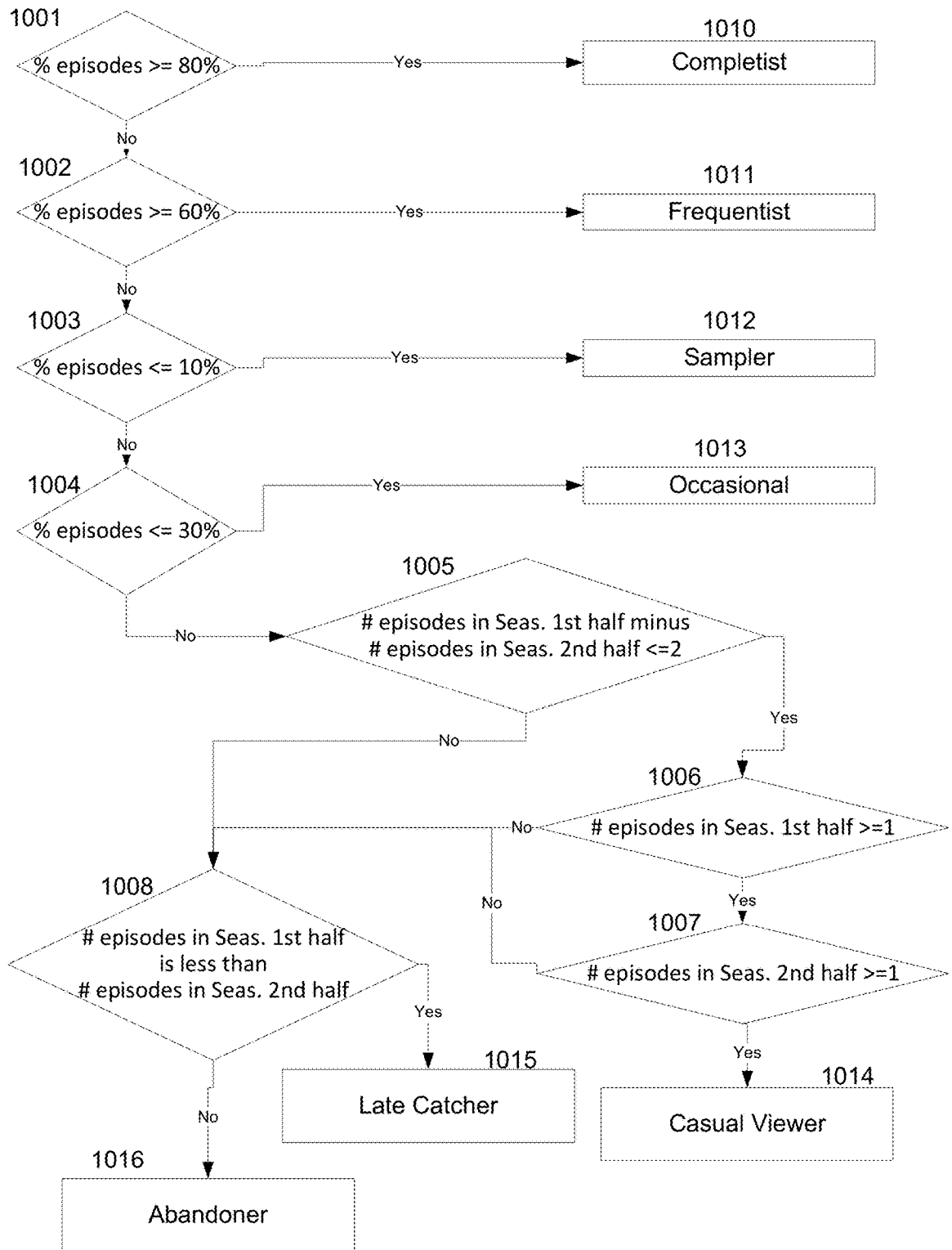
FIG. 10 shows an example flow chart for classifying a viewer's level of engagement/loyalty to a program or channel.

At steps 350 and 355, for each relevant viewer (as determined above at step 325 based on the determined report parameters), the centralized computing device may classify the viewer based on viewership data corresponding to that season, or programming type, as described in more detail with respect to FIG. 10. Classifying the viewer may support various report outcomes described below for FIGS. 5-10.

In step 360, an analysis software module may process data stored in a database or other data store, aggregating the data on viewership of one or more viewers in order to find viewership patterns and perform predictive analytics. FIGS. 5-10, described below, depict the potential report outcomes of an analysis software module in greater detail. The results of analyzing first-order data for a particular viewer may yield second-order data, classifying a particular viewer's relationship with a program or a channel, such as the viewer's level of engagement/loyalty to a program or channel, or the times of day that a viewer typically tunes into a channel. The first-order data of many viewers may be aggregated and processed by an unsupervised classification algorithm to generate classifications of viewers that may neither be obvious third-order data, providing statistics, sub-groups, and classifications of the entire set of viewers of a given program or channel, and allowing for prediction of the behavior of the entire set in response to the broadcast of future episodes of a program, the extension of new seasons of a program, or a change in the scheduling of a program. The first order data of many viewers may additionally or alternatively be aggregated and processed by a supervised classification algorithm where information about the outcome is known.

In step 365, the report may be generated and may comprise determined viewership statistics, dependencies, and patterns. The report may comprise visual representation(s) for straightforward analysis by a user. These visual representations may comprise tables, charts, graphs, infographics, or narrative text. FIGS. 5-9, described below, illustrate a subset of potential depictions of determined patterns in greater detail.

FIG. 4 illustrates an example set of "in-episode" and "in-network" data that may be determined and stored in step 305.

When a viewer begins viewing a particular episode or element of media content, the data which may be stored in step 305 may comprise any or all of: a channel or network 400 that was viewed, the name of a program 405 shown on that channel, and the particular season 410 and episode 415 of the program that was viewed. This information may already be known to a set top box or other display device facilitating the display of the media content, or may be determined by cross-referencing the tuning data from the set top box or other display device with a schedule of programming for one or more channels. A minimum viewing time may be required before creating a data entry for the program viewing. A default minimum viewing time may be set to 6 minutes, 1 minute, 5 seconds, one second, or any other predetermined duration of time.

The total duration 420 of a program which was viewed may be stored, and the longest uninterrupted duration 425 of a program which was viewed may also be stored, if the total duration represents multiple ranges of time separated by a viewer changing channels or turning on/off a display. The number of such tuning events 430 may also be stored.

The platform 435 used to facilitate viewing may be stored. The platform may be denoted as "linear" (indicating that the viewer is viewing a channel in live streaming/broadcast/linear mode without control over the content from that channel), "video-on-demand" (VOD) (indicating that the viewer selected media content from a menu of options for transmission from a data source to a display device used by the viewer, whether that device is a set top box, smartphone, personal computer), or "digital video recorder" (DVR) (indicating that the viewer caused an episode of content to be recorded from a live stream, but is now viewing the episode from that saved content rather than live or on-demand). If a viewer watches a single episode repeatedly on multiple platforms, the stored data may be updated to reflect the platform of the viewing with the longest viewing time.

A viewing delay 440 may also be stored. The viewing delay may be the duration of time which has elapsed, at the time the viewer views an episode, since the episode was first aired as a live broadcast. For an episode which is viewed live and is not a "re-run", a notation of "live" may be stored as the viewing delay. For linear broadcast of re-runs, video-on-demand, or play of video from a DVR, a viewing delay may be stored as an exact duration, or may correspond to one of a number of predefined ranges. These predefined ranges may include "Within 1 Day", "2-3 Days", "4-7 Days", and "Beyond 7 Days".

A "daypart" 445 and day of the week 446 may also be stored, indicating a time of day and day of the week that a viewer viewed an episode. The daypart may be stored as an exact timestamp or time range, or may correspond to one of a number of predefined ranges. These predefined ranges may include "Early Morning" (6 a.m.-9 a.m.), "Morning" (9 a.m.-noon), "Daytime" (noon-3 p.m.), "Afternoon" (3 p.m.-6 p.m.), "Early Fringe" (6 p.m.-8 p.m.), "Prime" (8 p.m.-11 p.m.), "Late Fringe" (11 p.m.-2 a.m.), or "Overnight" (2 a.m.-6 a.m.).

In example record 450, a viewer may watch "Game of Thrones", season 5, episode 1 live on HBO at the time it first airs. The viewer may not change the channel at all, watching the show for the full 52 minutes without interruption.

In example record 451, a viewer may watch "Game of Thrones", season 5, episode 2 live on HBO at the time it first airs. However, the viewer may have begun watching after the episode already began, watched 12 minutes, quickly changed to another channel, then returned for 8 minutes before the program ended. Consequently, the total duration, longest uninterrupted duration and number of tunings fields may reflect different values from example record 450.

In example record 452, a viewer may watch "The Late Show" live on CBS, but repeatedly "channel surf" during parts of the show or commercials, such that the viewing time is divided into six periods, the longest of which is 10 minutes. Consequently, the total duration, longest uninterrupted duration and number of tune-outs fields may reflect these values.

In example record 453, a viewer may watch a rerun of "Seinfeld" on TBS at 7 p.m. on a Wednesday. The viewing delay may reflect only that the show, which originally aired many years ago, is at least 7 days old.

In example record 454, a viewer may watch a broadcast of "Today" on NBC at 8 am. on Thursday, watching for 5 minutes, flipping through a number of other channels, then 20 minutes, then another event of flipping through channels, then 5 more minutes before turning off the television.

In example record 455, a viewer may miss "Game of Thrones", season 5, episode 3, but find that it is available later that week "on demand." The viewer may request and view the entire episode starting at midnight, and the viewing delay and daypart may reflect this information.

In example record 456, a viewer may miss "Game of Thrones", season 5, episode 4, but have preprogrammed a DVR to record the episode. The viewer may view the entire episode starting at 3 am. the same night it originally aired, and the viewing delay and daypart may reflect this information.

"In-network" data may be generated by ignoring all fields except 400, 420, 425, 430, and 445, then grouping records by channel in order to determine statistics such as the total duration of time that a viewer watched a channel, the distribution of times of day that the viewer watched a channel, the average longest uninterrupted duration of time that a viewer watched a channel, or how often a viewer changes the channel away from a given channel.

By aggregating and the "in-episode" and "in-network" data, a number of second-order statistics may be determined for a single viewer or household, or a population of viewers or households, with respect to an episode or a series. A graphical interface may be generated to view statistics derived from the data, including analyzing television series platform viewing trends across Linear, VOD, and DVR; examining viewing delay patterns subsequent to a season finale airing; classifying TV series viewers based upon their viewing over an entire season; gauging engagement with individual episodes based upon viewing within the episode; and forming audience composition profiles of target and comparable programs A lead-in/lead-out behavior may be determined for a viewer or household viewing an episode based on minute-by-minute audience behavior before, within, and after the episode. A viewer's behavior may be classified as "Lead-in" (having watched at least six of the ten minutes prior to the beginning of the episode), "Start-in" (having watched at least six of the ten minutes at the beginning of the program, but did not watch six of ten minutes prior to the beginning of the episode), "Tune-in" (having tuned in during the course of the program, but did not watch six of ten minutes prior to the beginning of the episode), "Lead-out" (having tuned in to at least six of the first ten minutes to the program following the episode), "Tune-out" (did not view at least six of the first ten minutes of the program following the episode), or "End-out" (having watched at least six of the last ten minutes of the program (but did not watch at least six of the first ten minutes of the program following the episode)

A consumption frequency may be determined for a viewer or household that defines how many episodes were viewed of a series within a specific timeframe, to allow distinction between binge and non-binge viewing. A consumption frequency for a viewer or household may be determined to be, for example, "1 episode only within +/−7 days from the current episode viewing", "2+ episodes within +/−4-7 days", "2+ episodes within +/−2-3 days", or "2+ episodes within +/− 1 day".

An engagement score may be determined by using a variety of the first-order data metrics (including but not limited to time spent viewing, tune-in/out patterns, and lead-in/lead-out behavior) to calculate the engagement of a household with a particular episode. These patterns may be based upon a model which evaluates viewing behavior variables and estimates a likelihood that the same household watches the next episode of that program. Each viewing of an episode by a viewer or household may be assigned a score of 0-100% based on the model, or may be assigned scores according to a different numeric or qualitative scale. Based upon these scores, a linear episodic view may be classified into one of three categories: "Engaged" (which may correspond to a score of 60% or above), "Undecided" (which may correspond to a score of 35-60%) or "Disengaged" (which may correspond to a score of 0-35%).

Figures 5A, 5B:
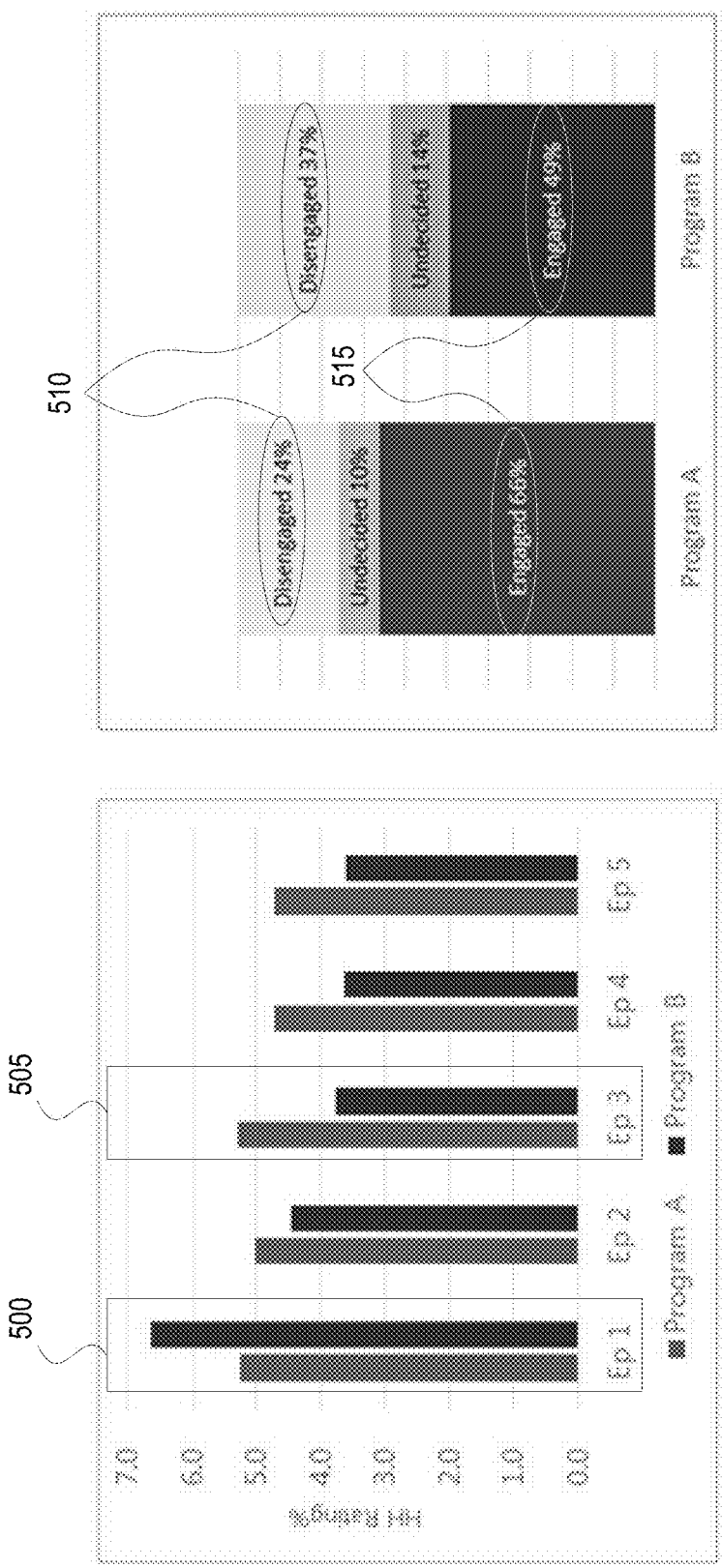
FIGS. 5A and 5B illustrates graphs which may be generated to show total viewership and viewer engagement for one or more programs, according to one or more aspects described herein.

FIG. 5A illustrates an example bar graph which may be generated, showing a total viewership over a series of episodes for two programs, Program A and Program B. Although Program B initially seems to be much more popular after the first episode, at time 500, by the third episode, at time 505, Program A has overtaken B as the more popular show. Without engagement analysis, this relative change between the shows may be impossible to predict or explain. However, if an engagement analysis is performed as of time 500, as illustrated in FIG. 5B, it may be apparent that despite Program A's smaller initial audience, Program A has more engaged 515 and fewer disengaged viewers 510 than Program B, making the dropoff in Program B's support predictable.

Figure 6:
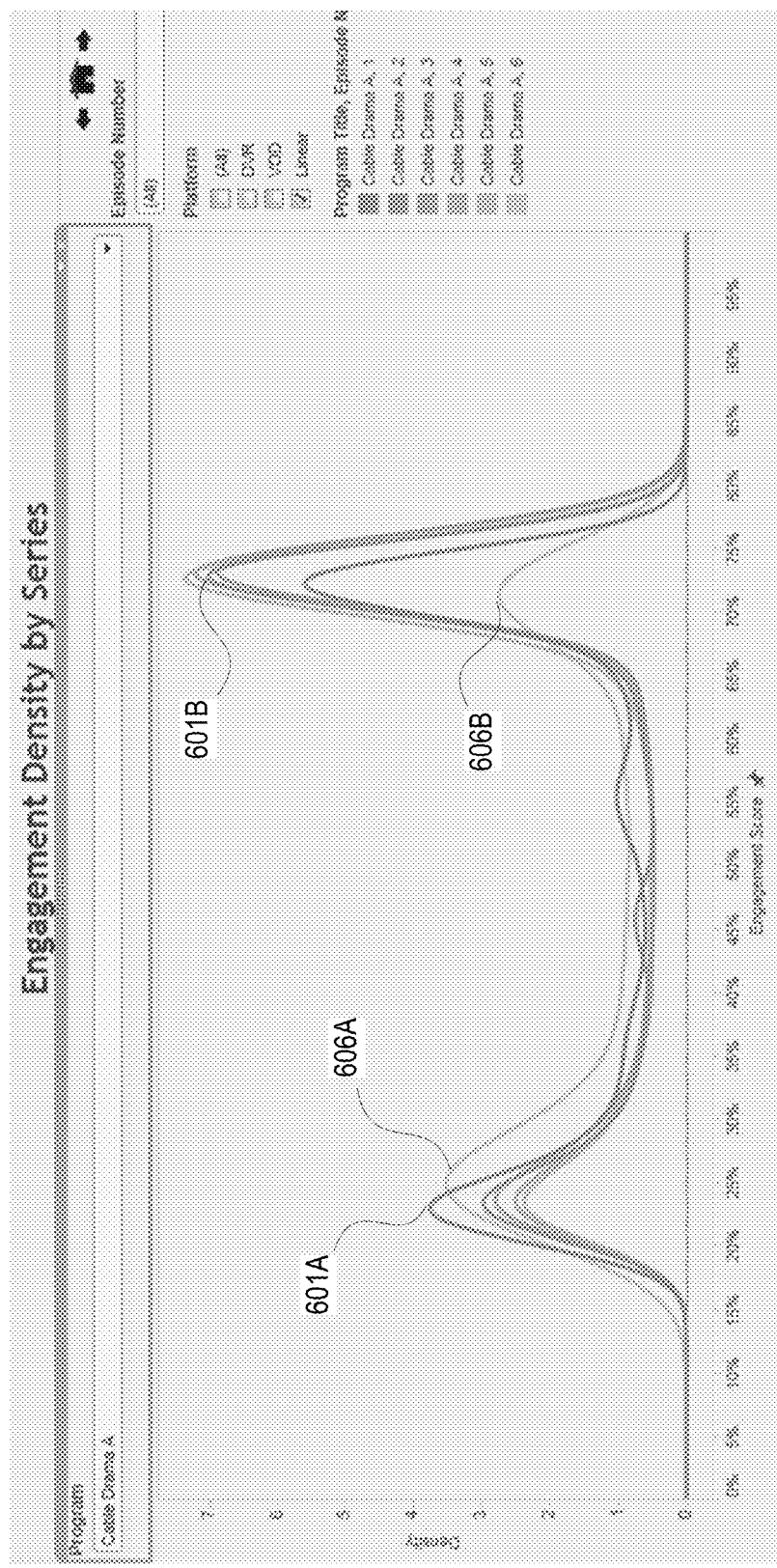
FIG. 6 illustrates a set of engagement density curves which may be generated and displayed based on a viewer's or household's data, according to one or more aspects described herein.

FIG. 6 illustrates a set of engagement density curves which may be generated and displayed based on a viewer's or household's data. A series of curves may be generated which compare a range of possible engagement scores on the horizontal axis with a relative proportion of viewers having that engagement on the vertical axis.

In one example, the first episode of a season may have a bimodal distribution of viewers, where the most common response is a high engagement of approximately 75% (at 601B) and the second-most common response is a low engagement of approximately 25% (at 601A), with most other viewers having scores in the "Undecided" range. In contrast, by the sixth episode of the season, interest may have waned. There may still be a bimodal distribution, but the most common response is now disengagement (at 606A), while engagement is less common (at 606B).

Figures 7A, 7B:
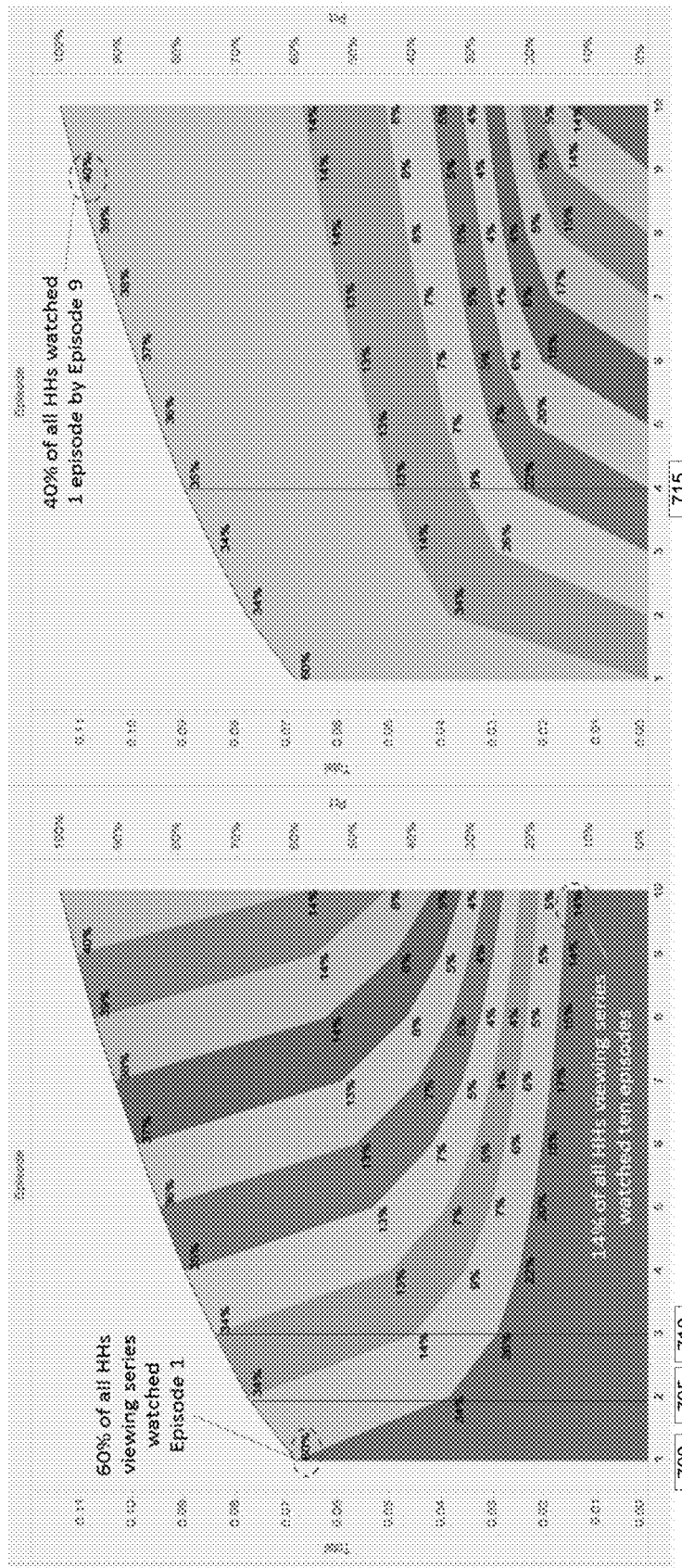
FIGS. 7A and 7B illustrate an analysis of household retention and total viewership of a season of a program, according to one or more aspects described herein.

FIGS. 7A and 7B illustrate an analysis of household retention and total viewership of a season of a program, according to one or more aspects described herein.

FIG. 7A illustrates the distribution of the audience of a given episode by when the audience began watching a series. For example, the data on vertical line 700 may indicate that out of all households who eventually watched a program, 60% of them watched the first episode. The data on vertical line 705 may indicate that out of the total 68% of series watchers who saw episode 2, 34% had seen episode 1, and 34% were seeing the series for the first time. The data on vertical line 710 may indicate that out of the 74% of series watchers who saw episode 3, 26% had seen episodes 1 and 2, 14% had seen episode 2 but not episode 1, and 34% were seeing the series for the first time. By the right edge of the graph of FIG. 7A, it can be seen that 100% of series viewers had begun viewing the series at a point between episodes 1 and 10, and that, for example, 14% of the episode 1 viewers had seen all ten episodes.

FIG. 7B illustrates the same data set, but with each color band indicating the total number of episodes seen, rather than the point at which the audience began watching. For example, the data on vertical line 715 may indicate that after the first four episodes, 22% of the series audience had viewed all four, 9% viewed three, 13% viewed two, and 35% viewed only one.

FIGS. 8A and 8B illustrate an entry/exit platform analysis that may be performed to determine the dominant platform paths that households take when viewing a series. Data may be considered from all viewing of households that viewed at least a predetermined number of episodes of a series, such as three. Entry or "beginning" 800 may be defined as the dominant platform used be viewers early in the program season, while exit or "ending" 805 may be defined as the dominant platform used to view the final episodes of a season. In the generated graph, the size of the circles may show the relative numbers of viewers having an entry/exit behavior. Color or shading may be further used to show an average number of episodes viewed for a given entry/exit behavior. In FIG. 8A, as might be expected, most viewers continue to use a platform with which they began, leading to the diagonal line of larger circles 810A-C as linear matches with linear, VOD matches with VOD, and DVR matches with DVR. In FIG. 8B, a change in broadcast behavior by releasing episodes to VOD before linear broadcast leads to a striking change in the size of the circles 815A-C, indicating that fewer viewers choose to watch the linear broadcast, and almost none choose to record an episode to DVR when VOD is available from the beginning.

Viewership data may also be analyzed to determine a "maximal single platform path", which indicates the platform (of linear, VOD, or DVR) on which the most episodes of a series have been watched in a row without switching to a different platform.

A viewer or household may be assigned a loyalty cluster with respect to a given season of a given program. A viewer may be classified as a "Heavy Viewer" or "Completist" (having viewed 80% or more of all episodes of the season), a "Moderate Viewer" or "Frequentist" (having viewed between 60% and 80% of all episodes of the season), a "Light Viewer" or "Casual Viewer" (having viewed between 30% and 60% of all episodes of the season, with the difference between the number of viewed episodes in the first half of the season and the second half of the season being less than a predetermined number, such as two), a "Late Catcher" (having viewed between 30% and 60% of all episodes of the season, with more episodes viewed in second half of the season than in the first half), an "Abandoner" (having viewed between 30% and 60% of all episodes of the season, with more episodes viewed in first half of the season than in the second half), a "Trialist" or "Occasional" (having viewed between 10% and 30% of all episodes of the season), or a "Random" or "Sampler" (having viewed at least one episode but less than 10% of all episodes of the season).

In addition, the sets of "Heavy"/"Completist" and "Moderate"/"Frequentist" viewers may be consolidated into a single group designated as "Fans." A number of statistics for the set of all fans of a show may be determined, including an average number of fans watching a network or show per minute during a given daypart and/or day of week, total number of fans per daypart or per day of week, and most watched other shows by fans of a given show (which may be normalized by a comparison of a show's popularity with fans and the show's popularity with non-fans, in order to find shows that are particularly popular among fans and not merely popular among all viewers).

FIG. 9 illustrates a graph which may be generated, showing relative numbers of viewers with a given viewership designation, as well as the preferred platform choices of those viewers. Within each of the vertical bars 900-930, the magnitude of use of each viewing platform may be For example, completists 900 may be much more likely than average to use DVR, as indicated by the magnitude of the top bar of their column, while samplers 930 virtually never do. Completists 900 may be three to four times as likely to watch via VOD (the middle bar of the column) as via linear (the bottom bar of the column), while casual viewers 915 may be three to four times as likely to watch via linear as via VOD.

FIG. 10 shows an example flow chart for classifying a viewer's level of engagement/loyalty to a program or channel. The level of engagement/loyalty may be determined, for example, based on the percentage of episodes of a season that a viewer viewed, and/or based on which episodes a viewer viewed, such as whether the the viewed episodes were primarily in the first half of the season or the second half of the season.

At step 1001, if the viewer has viewed 80% or more episodes, the viewer may be classified as a "Completist" at 1010. Otherwise, at step 1002, if the viewer has viewed 60% or more episodes, the viewer may be classified as a "Frequentist" 1011.

At step 1003, if the viewer has viewed 10% or fewer episodes, the viewer may be classified as a "Sampler" 1012. Otherwise, if the viewer has viewed 30% or fewer episodes, the viewer may be classified as a "Occasional" 1013.

At steps 1005-1008, for viewers who have viewed between 30% and 60% of the episodes, the viewer may be classified based on whether it primarily viewed episodes from the first half of the season or the second half of the season. At steps 1005-1007, if the number of episodes viewed in the first half of the season minus the number of episodes viewed in the second half of the season is less than or equal to two, and the viewer viewed at least one episode in each half of the season, the viewer may be classified as a "Casual Viewer" 1014. Otherwise, at step 1008, if the number of episodes viewed in the first half of the season is less than the number of episodes viewed in the second half of the season, the viewer may be classified as a "Late Catcher" 1015. Alternatively, if the number of episodes viewed in the first half of the season is greater than or equal to the number of episodes viewed in the second half of the season, the viewer may be classified as an "Abandoner" 1016. As may be appreciated, alternative percentages or classifications may be used to classify a viewer's level of engagement/loyalty to a program or channel.

Figure 11:
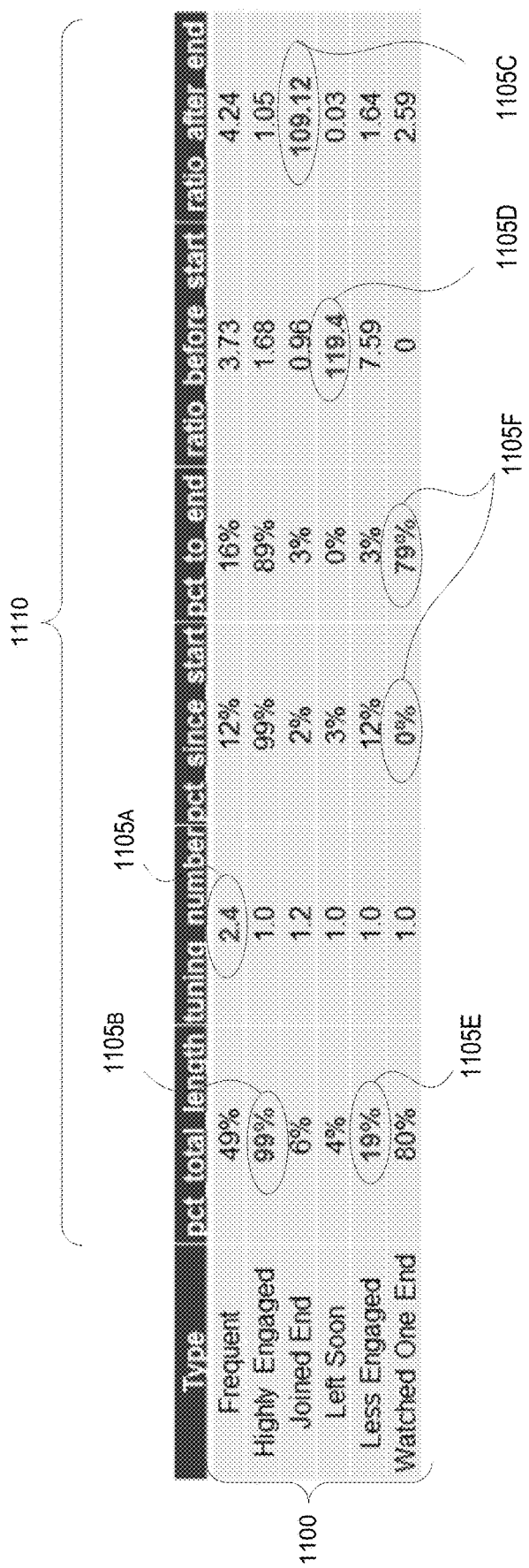
FIG. 11 depicts the results of an unsupervised classification algorithm that may be performed, according to one or more aspects described herein.

FIG. 11 depicts example results of an unsupervised classification algorithm that may be performed, according to one or more aspects described herein.

In this example, a k of six may be chosen, and the algorithm may generate six groups 1100 of viewers, who may be designated by a human reviewer of the output as, in one example, "Frequent", "Highly Engaged", "Joined End", "Left Soon", "Less Engaged", and "Watched One End". The classifications may be based on input data such as number of tuning events, total time viewed, time began viewing, time ended viewing, or any other input data. After the six clusters have been identified, further average statistics 1110 for each cluster may be determined, and analytics may be used to predict future behavior of viewers in that cluster based on the criteria for membership in the cluster identified by the k-means classifier.

Despite being clustered without human interference in the algorithm, FIG. 11 shows that each cluster has a defining feature 1105A-F that may be of use in predicting future viewer behavior, such as the percent of the episode viewed, the number of times the channel was tuned to a different network, or whether viewers of a show stopped watching as soon as the show began or ended.

Although embodiments herein have been described which focus on episodic video content comprising a television program that comprises of a number of episodes across a number of seasons, the principles may be extended to other video content with demarcations that divide the content into subdivisions, such as a series of webcasts or video streams from a given source or producer (such those available for viewing on a content producer's YouTube.com or Twitch.tv channel); broadcast or recorded matches of e-sports contests and tournaments; broadcast, recorded, or pay-per-view transmissions of actual sports contests during a league season; or political debates or other events of an election season. The principles herein may also be applied to episodic or subdivided audio content, such as a series of podcasts, a series of tracks on a music album, or a series of tracks available for streaming from a music distribution website like Spotify or Pandora. The principles herein may also be applied to episodic or subdivided literary content, such as a series of chapters in an online work of fiction, a series of books available on an e-reader device (such as a Kindle or Nook device), a series of blog posts on a user's blog, a series of editorials from a columnist, or a series of posts in a rich site summary (RSS) feed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:
1. A method comprising:
receiving, by a computing device, viewership information for a plurality of content items;
determining, based on the viewership information:
a plurality of stop times for the plurality of content items; and
a missing stop time for when a content output device stopped outputting one of the content items;
updating a data structure for tracking viewership information, wherein updating the data structure comprises:

storing, in the data structure, the viewership information by storing start event times and stop event times of content output sessions for each content item, of the plurality of content items; and updating the viewership information to add the missing stop time based on:
  stop times of a plurality of prior content output sessions in which the one of the content items was output by other content output devices; and
  stop times of a second plurality of prior content output sessions in which other content items, different from the one of the content items, were output by the content output devices device;

classifying, based on applying a classification algorithm to the updated viewership information, a plurality of users based on the stop times for each content item;

modifying, based on the classification of the plurality of users, a schedule for delivery of a content item to a requesting device; and initiating, based on the schedule, delivery of the content item.

2. The method of claim 1, wherein the one of the content items is an episode in a series of episodes, and the updated viewership information of the one of the content items is based on a stop time of a different episode in the series.

3. The method of claim 1, wherein the updated viewership information is based on:
  a genre of the one of the content items;
  a daypart corresponding to the genre; and
  at least one content output session, of the second plurality of prior content output sessions, of content items of the genre, wherein the at least one content output session comprises a stop time where a second content output device stopped watching a content item.

4. The method of claim 1, wherein the modifying the schedule comprises stopping a scheduled transmission of the content item based on the updated viewership information.

5. The method of claim 1, wherein updating the viewership information is further based on estimated audience sizes.

6. The method of claim 1, further comprising:
  receiving information indicating a geographic area of the content output device; and
  determining the missing stop time by selecting stop times that correspond to content output sessions that occurred at or near the geographic area.

7. The method of claim 1, wherein the updated viewership information comprises a time that transmission of the one of the content items ended.

8. The method of claim 1, further comprising:
  sending, to one or more similar content output devices, a second content item, wherein the similar content output devices are determined based on:
    a common genre between users;
    a common daypart, corresponding to the common genre, between users;
    at least one output session of a first content item that is common between users; and
    a common content delivery platform between users.

9. The method of claim 1, further comprising causing, based on viewership information associated with one or more content delivery platforms for one of the plurality of content items, sending of another one of the plurality of content items via another one of the content delivery platforms.

10. The method of claim 1, wherein the initiating delivery further comprises initiating streaming of the content item, by a server, to the requesting device.

11. The method of claim 1, wherein the initiating delivery further comprises determining, by the computing device, that the requesting device has requested media from a particular media source.

12. The method of claim 1, wherein the classification algorithm is an unsupervised machine learning algorithm.

13. The method of claim 1, wherein the updating the viewership information comprises storing, in the data structure, a complete chronological ordering of the viewership information.

14. The method of claim 1, wherein the updating the viewership information is further based on:
  weighting the stoptimes of the plurality of prior content output sessions differently from the stop times of the second plurality of prior content output sessions.

15. An apparatus comprising:
  at least one processor; and
  at least one memory having stored therein machine executable instructions that, when executed by the at least one processor, cause the apparatus to:
    receive viewership information for a plurality of content items;
    determine, based on the viewership information, a plurality of stop times for the plurality of content items and a missing stop time for when a content output device stopped outputting one of the content items;
    update a data structure for tracking viewership information, wherein the data structure comprises a plurality of counters corresponding to different time slots;
    wherein the instructions, when executed, cause the apparatus to update the data structure by:
      storing, in the data structure, the viewership information by incrementing, based on the plurality of stop times, at least one counter of the plurality of counters; and
      updating the viewership information to add the missing stop time based on:
        stop times of a plurality of prior content output sessions in which the one of the content items was output by other content output devices; and
        stop times of a second plurality of prior content output sessions in which other content items, different from the one of the content items, were output by the content output device;
    classify, based on applying a classification algorithm to the updated viewership information, a plurality of users based on the at least one counter;
    modify, based on the classification of the plurality of users, a schedule for delivery of a content item to a requesting device; and
    initiate, based on the schedule, delivery of the content item.

16. The apparatus of claim 15, wherein the one of the content items is an episode in a series of episodes, and the updated viewership information of the one of the content items is based on a stop time of a different episode in the series.

17. The apparatus of claim 15, wherein the updated viewership information is based on:
  a genre of the one of the content items;
  a daypart corresponding to the genre; and at least one content output session, of the second plurality of prior content output sessions, of content items of the genre, wherein the at least one content output session comprises a stop time where a second content output device stopped outputting a content item.

18. The apparatus of claim 15, wherein the machine executable instructions, when executed by the at least one processor, cause the apparatus to modify the schedule by stopping a scheduled transmission of the content item based on the updated viewership information.

19. The apparatus of claim 15, wherein updating the viewership information is further based on estimated audience sizes.

20. The apparatus of claim 15, wherein the machine executable instructions, when executed by the at least one processor, cause the apparatus to:
receive information indicating a geographic area of the content output device; and
determine the missing stop time by selecting stop times that correspond to content output sessions that occurred in a same or nearby geographic area.

21. The apparatus of claim 15, wherein the updated viewership information comprises a time that transmission of the one of the content items ended.

22. The apparatus of claim 15, wherein the machine executable instructions, when executed by the at least one processor, cause the apparatus to:
send, to one or more similar content output devices, a second content item, wherein the similar content output devices are determined based on:
a common genre between users;
a common daypart, corresponding to the common genre, between users;
at least one output session, of a first content item, wherein the first content item is common between users; and
a common content delivery platform between users.

23. The apparatus of claim 15, wherein the machine executable instructions, when executed by the at least one processor, cause the apparatus to cause, based on viewership information associated with one or more content delivery platforms for one of the plurality of content items, sending of another one of the plurality of content items via another one of the content delivery platforms.

24. The apparatus of claim 15, wherein the machine executable instructions, when executed by the at least one processor, further cause the apparatus to initiate streaming of the content item, by a server, to the requesting device.

25. The apparatus of claim 15, wherein the machine executable instructions, when executed by the at least one processor, further cause the apparatus to determine that the requesting device has requested media from a particular media source.

26. The apparatus of claim 15, wherein the classification algorithm is an unsupervised machine learning algorithm.

27. The apparatus of claim 15, wherein the machine executable instructions, when executed by the at least one processor, cause the apparatus to update the viewership information by storing, in the data structure, a complete chronological ordering of the viewership information.

28. The method of claim 15, wherein the updating the viewership information is further based on:
weighting the stoptimes of the plurality of prior content output sessions differently from the stop times of the second plurality of prior content output sessions.

29. The apparatus of claim 15, wherein the machine executable instructions, when executed by the at least one processor, cause the apparatus to classify the plurality of users by aggregating, based on the at least one counter, the updated viewership information.

30. A method comprising:
retrieving, from a centralized database, content output data for a content output device, the content output data comprising information indicating a plurality of content output sessions of the content output device;
updating a data structure for tracking content output sessions of the content output device, wherein the data structure comprises boundary times for content output sessions and wherein updating the data structure comprises storing, in the data structure and based on the retrieved content output data, a plurality of boundary times of the plurality of content output sessions;
determining a missing boundary time for one of the plurality of content output sessions, wherein the missing boundary time comprises a missing viewing stop time associated with an episode of a network series;
determining, based on the content output data for the content output device, that the content output device has outputted at least one other episode of the network series, and based on a subset of the content output data for the content output device corresponding to the at least one other episode of the network series, a first candidate boundary time;
determining a network programming for the missing boundary time and, based on content output data for a plurality of other content output devices corresponding to the network programming, a second candidate boundary time;
updating the plurality of boundary times based on a substitute candidate boundary time for the episode of the network series, based on a weighted average of the first candidate boundary time and the second candidate boundary time; and
modifying, based on the plurality of boundary times, a content delivery schedule to provide delivery of a requested episode of the network series with delivery of another content item.

31. The method of claim 30, further comprising stopping sending of the requested episode of the network series based on the updated plurality of boundary times.

32. The method of claim 30, wherein the substitute candidate boundary time is further based on estimated audience sizes.

33. The method of claim 30, wherein the substitute candidate boundary time comprises a time that transmission of the network series ended.

34. The method of claim 30, further comprising:
sending, to one or more similar content output devices, a second episode, wherein the similar content output devices are determined based on:
a common genre between users;
a common daypart, corresponding to the common genre, between users;
at least one output session of a first episode that is common between users; and
a common content delivery platform between users.

35. The method of claim 30, further comprising causing, based on viewership information associated with one or more content delivery platforms for a content item, sending the requested episode via another one of the content delivery platforms.

36. The method of claim 30, further comprising initiating, based on the content delivery schedule, streaming of the requested episode, by a server, to a requesting device.

37. The method of claim 30, wherein the modifying the content delivery schedule further comprises determining, by a computing device, that the content output device has requested an episode from a particular media source.

38. One or more non-transitory computer readable medium storing instructions that, when executed, cause:
receiving, by a computing device, viewership information for a plurality of content items;
determining, based on the viewership information:
  a plurality of stop times for the plurality of content items; and
  a missing stop time for when a content output device stopped outputting one of the content items;
updating a data structure for tracking viewership information, wherein updating the data structure comprises:
  storing, in the data structure, the viewership information by storing start event times and stop event times of content output sessions for each content item, of the plurality of content items; and
  updating the viewership information to add the missing stop time based on:
    stop times of a plurality of prior content output sessions in which the one of the content items was output by other content output devices; and
    stop times of a second plurality of prior content output sessions in which other content items, different from the one of the content items, were output by the content output device;
classifying, based on applying a classification algorithm to the updated viewership information, a plurality of users based on the stop times for each content item;
modifying, based on the classification of the plurality of users, a schedule for delivery of a content item to a requesting device; and
initiating, based on the schedule, delivery of the content item.

39. The one or more non-transitory computer readable medium of claim 38, wherein the one of the content items is an episode in a series of episodes, and the updated viewership information of the one of the content items is based on a stop time of a different episode in the series.

40. The one or more non-transitory computer readable medium of claim 38, wherein the updated viewership information is based on:
a genre of the one of the content items;
a daypart corresponding to the genre; and
at least one content output session, of the second plurality of prior content output sessions, of content items of the genre, wherein the at least one content output session comprises a stop time where a second content output device stopped watching a content item.

41. The one or more non-transitory computer readable medium of claim 38, wherein the modifying the schedule comprises stopping a scheduled transmission of the content item based on the updated viewership information.

42. The one or more non-transitory computer readable medium of claim 38, wherein updating the viewership information is further based on estimated audience sizes.

43. The one or more non-transitory computer readable medium of claim 38, wherein the instructions, when executed, further cause:
receiving information indicating a geographic area of the content output device; and
determining the missing stop time by selecting stop times that correspond to content output sessions that occurred at or near the geographic area.

44. The one or more non-transitory computer readable medium of claim 38, wherein the updated viewership information comprises a time that transmission of the one of the content items ended.

45. The one or more non-transitory computer readable medium of claim 38, wherein the instructions, when executed, further cause:
sending, to one or more similar content output devices, a second content item, wherein the similar content output devices are determined based on:
  a common genre between users;
  a common daypart, corresponding to the common genre, between users;
  at least one output session of a first content item that is common between users; and
  a common content delivery platform between users.

46. The one or more non-transitory computer readable medium of claim 38, wherein the instructions, when executed, further cause, based on viewership information associated with one or more content delivery platforms for one of the plurality of content items, sending of another one of the plurality of content items via another one of the content delivery platforms.

47. The one or more non-transitory computer readable medium of claim 38, wherein the initiating delivery further comprises initiating streaming of the content item, by a server, to the requesting device.

48. The one or more non-transitory computer readable medium of claim 38, wherein the initiating delivery further comprises determining, by the computing device, that the requesting device has requested media from a particular media source.

49. The one or more non-transitory computer readable medium of claim 38, wherein the classification algorithm is an unsupervised machine learning algorithm.

50. The one or more non-transitory computer readable medium of claim 38, wherein the updating the viewership information comprises storing, in the data structure, a complete chronological ordering of the viewership information.

51. The one or more non-transitory computer readable medium of claim 38, wherein the updating the viewership information is further based on:
weighting the stoptimes of the plurality of prior content output sessions differently from the stop times of the second plurality of prior content output sessions.

52. A system comprising:
a requesting device configured to receive delivery of content items; and
a computing device comprising:
  one or more processors; and
  memory storing instructions that, when executed by the one or more processors, cause the computing device to:
    receive viewership information for a plurality of content items;
    determine, based on the viewership information:
      a plurality of stop times for the plurality of content items; and
      a missing stop time for when a content output device stopped outputting one of the content items;
    update a data structure for tracking viewership information, wherein the instructions, when executed by the one or more processors, cause the computing device to update the data structure by:
      storing, in the data structure, the viewership information by storing start event times and stop event times of content output sessions for each content item, of the plurality of content items; and updating the viewership information to add the missing stop time based on:
stop times of a plurality of prior content output sessions in which the one of the content items was output by other content output devices; and
stop times of a second plurality of prior content output sessions in which other content items, different from the one of the content items, were output by the content output device;

classify, based on applying a classification algorithm to the updated viewership information, a plurality of users based on the stop times for each content item;

modify, based on the classification of the plurality of users, a schedule for delivery of a content item to the requesting device; and initiate, based on the schedule, delivery of the content item.

53. The system of claim 52, wherein the one of the content items is an episode in a series of episodes, and the updated viewership information of the one of the content items is based on a stop time of a different episode in the series.

54. The system of claim 52, wherein the updated viewership information is based on:
a genre of the one of the content items;
a daypart corresponding to the genre; and
at least one content output session, of the second plurality of prior content output sessions, of content items of the genre, wherein the at least one content output session comprises a stop time where a second content output device stopped watching a content item.

55. The system of claim 52, wherein the instructions, when executed by the one or more processors, cause the computing device to modify the schedule by stopping a scheduled transmission of the content item based on the updated viewership information.

56. The system of claim 52, wherein updating the viewership information is further based on estimated audience sizes.

57. The system of claim 52, wherein the instructions, when executed by the one or more processors, further cause the computing device to:
receive information indicating a geographic area of the content output device; and determine the missing stop time by selecting stop times that correspond to content output sessions that occurred at or near the geographic area.

58. The system of claim 52, wherein the updated viewership information comprises a time that transmission of the one of the content items ended.

59. The system of claim 52, wherein the instructions, when executed by the one or more processors, further cause the computing device to:
send, to one or more similar content output devices, a second content item, wherein the similar content output devices are determined based on:
a common genre between users;
a common daypart, corresponding to the common genre, between users;
at least one output session, of a first content item, wherein the first content item is common between users; and
a common content delivery platform between users.

60. The system of claim 52, wherein the instructions, when executed by the one or more processors, further cause the computing device to cause, based on viewership information associated with one or more content delivery platforms for one of the plurality of content items, sending of another one of the plurality of content items via another one of the content delivery platforms.

61. The system of claim 52, wherein the instructions, when executed by the one or more processors, further cause the computing device to initiate streaming of the content item, by a server, to the requesting device.

62. The system of claim 52, wherein the instructions, when executed by the one or more processors, further cause the computing device to determine that the requesting device has requested media from a particular media source.

63. The system of claim 52, wherein the classification algorithm is an unsupervised machine learning algorithm.

64. The system of claim 52, wherein the instructions, when executed by the one or more processors, cause the computing device to update the viewership information by storing, in the data structure, a complete chronological ordering of the viewership information.

65. The system of claim 52, wherein the instructions, when executed by the one or more processors, cause the computing device to update the viewership information further based on:
weighting the stop times of the plurality of prior content output sessions differently from the stop times of the second plurality of prior content output sessions.

* * * * *